United States Patent [19]

Klemann et al.

[11] Patent Number: 4,830,787

[45] Date of Patent: May 16, 1989

[54] LOW CALORIE FAT MIMETICS COMPRISING CARBOXY/CARBOXYLATE ESTERS

[75] Inventors: Lawrence P. Klemann, Somerville; John W. Finley, Whippany, both of N.J.

[73] Assignee: Nabisco Brands, Inc., Parsippany, N.J.

[21] Appl. No.: 85,434

[22] Filed: Aug. 13, 1987

[51] Int. Cl.$^4$ .............................................. C11C 3/00
[52] U.S. Cl. ......................... 260/410; 260/410.9 R; 426/603; 426/607; 426/611; 426/613; 426/804
[58] Field of Search .................. 260/410 R, 410.9 R, 260/410.9 A, 410.9 C, 410.9 D, 410.9 E, 410.9 H, 410.9 L; 426/603, 607, 611, 613, 804

[56] References Cited

U.S. PATENT DOCUMENTS

| | | | |
|---|---|---|---|
| 2,962,419 | 11/1960 | Minich | 167/81 |
| 3,226,239 | 12/1965 | Schoch et al. | 106/38.5 |
| 3,441,953 | 4/1969 | Dumont et al. | 117/139.5 |
| 3,449,489 | 6/1969 | Gaunt | 424/31 |
| 3,537,865 | 11/1970 | Daniels et al. | 260/410.7 |
| 3,579,548 | 5/1971 | Whyte | 260/10.7 |
| 3,600,186 | 8/1971 | Mattson et al. | 99/1 |
| 3,989,728 | 11/1976 | Martin | 260/410.7 |
| 4,396,635 | 8/1983 | Roudebush et al. | 426/243 |
| 4,508,746 | 4/1985 | Hamm | 426/601 |
| 4,529,814 | 7/1985 | Fischer et al. | 260/410.9 R |
| 4,582,715 | 4/1986 | Volpenhein | 426/603 |
| 4,582,927 | 4/1986 | Fulcher | 560/201 |
| 4,626,443 | 12/1986 | Takahashi et al. | 426/602 |
| 4,711,922 | 12/1987 | Hull et al. | 524/310 |

FOREIGN PATENT DOCUMENTS

| | | |
|---|---|---|
| 1106681 | 8/1981 | Canada . |
| 34858 | 9/1981 | European Pat. Off. . |
| 184259 | 6/1986 | European Pat. Off. . |
| 233856 | 8/1987 | European Pat. Off. . |
| 236288 | 9/1987 | European Pat. Off. . |
| 1815706 | 6/1970 | Fed. Rep. of Germany . |
| 2456631 | 8/1976 | Fed. Rep. of Germany . |
| 2806804 | 2/1978 | Fed. Rep. of Germany . |
| 2254318 | 7/1975 | France . |
| 2329291 | 5/1977 | France . |
| 311900 | 5/1970 | U.S.S.R. | 260/410 |
| 952849 | 3/1960 | United Kingdom . |

OTHER PUBLICATIONS

Chemical Abstracts 93:132040t; Homolytic Addition of Alkanedicarboxylic Acid Esters to Alkyl Maleates, Ogibin et al.

Schreier, Peter, Wine Aroma Composition: Identification of Additional Volatile Constituents of Red Wine, J. Agric. Food Chem., vol. 28, pp. 926–928, 1980.

Am. J. Clinical Nutrition, R. W. Fallat et al., "Short Term Study of Sucrose Polyester a Non–Absorbable Fat–Like Material as a Dietary Agent for Lowering Plasma Cholesterol"; vol. 29, pp. 1204–1205, 1976.

Lipids, 2 H. J. Deuel Interscience Publishers, Inc., N.Y., 1955, p. 215.

Deuel, H. J., A. L. S. Cheng and M. G. Morehouse, Journal of Nutrition 35 295 [1948].

F. H. Mattson, Journal of Nutrition 69 338 (1959).

Ward, Gros and Feuge, New Fat Products: Glyceride Esters of Adipic Acid JAOCS, vol. 36, p. 667 (1959).

Hamm, D. J., Preparation and Evaluation of Trialkoxytricarballylate, Trialkoxycitrate, Trialkoxyglycerylether, Jojoba Oil, and Sucrose Polyester as Low Calorie Replacements of Edible Fats and Oils, J. of Food Science, vol. 49, (1984), pp. 419–426.

Primary Examiner—Patrick P. Garvin
Assistant Examiner—E. D. Irzinski
Attorney, Agent, or Firm—Richard Kornutik

[57] ABSTRACT

Novel fat mimetic compositions are disclosed as reduced calorie components. These compositions comprise a carbon backbone substituted with —CO$_2$R and/or —CH$_2$CO$_2$R (carboxylate and/or methyl carboxylate) and with —O$_2$C—R and/or —CH$_2$O$_2$C—R (carboxy and/or methylcarboxy) functionalities. The preferred carboxy/carboxylate esters are partially, but not completely, broken down in the body. These compounds thus achieve reduced caloric value and reduced problems associated with non-metabolizable fat substitutes. The fat mimetic compounds are useful in all edible compositions.

32 Claims, No Drawings

LOW CALORIE FAT MIMETICS COMPRISING CARBOXY/CARBOXYLATE ESTERS

BACKGROUND OF THE INVENTION

The present invention relates to edible fat mimetic materials, and especially to the new compounds having a desireable combination of properties and their use in edible compositions.

Obesity is perceived as a common problem in contemporary society. This condition is due, in many people, to a greater intake of calories than are expended. While genetic and behavioral factors play a major role, it is generally agreed that reasonable modifications of the caloric value of foods can be valuable in reaching a desirable equilibrium weight for an individual predisposed to obesity.

Many foods which provide gustatory satisfaction contain significant fat levels. This can be a problem for individuals drawn to these foods because fat has about twice the caloric density of protein and carbohydrates. It has, in fact, been estimated that fat contributes about 40% of the total calories in the diet. It has long been desired to reduce the available calories of dietary fat without decreasing the appeal or satiety expected of fatty foods. It has been reported that this would offer a convenient and practical method by which obesity could be controlled, ideally without requiring a dieter to restrict total food intake.

Unfortunately, none of the materials heretofore suggested as fat replacements has achieved all of the desirable attributes of natural triglyceride fats and oils. One approach to lower the caloric value of edible fat has been to decrease the amount of triglyceride that is absorbed in the human system since the usual edible triglyceride fats are almost completely absorbed (see Lipids, 2, H. J. Deuel, Interscience Publishers, Inc., New York 1955, page 215). The absorbability of triglyceride fat could be decreased by altering either the alcohol or the fatty acid portion of the molecule. There have been some experiments that have demonstrated a decrease in absorbability with certain fatty acids; for example, erucic acid (H. J. Deuel, A. L .S. Cheng, and M. G. Morehouse, Journal of Nutrition 35:295 (1948) and stearic acid if present as tristearin (F. H. Mattson, Journal of Nutrition 69:338 (1959). Also, U.S. Pat. No. 2,962,419, to Minich discloses that fatty acid esters which contain a neopentyl nucleus are not digested like normal fats and thus can be used as a fat substitute in food compositions.

Several other patents disclose edible compounds which are not digested or absorbed to the same extent as natural triglycerides. In U.S. Pat. No. 3,579,548, Whyte discloses certain glycerol esters of certain branched carboxylic acids which are said to have these properties. And, in U.S. Pat. No. 3,600,186, Mattson and Volpenhein disclose sugar and sugar alcohol fatty acid esters having at least four fatty acid ester groups. All of these compounds are said to possess physical properties similar to ordinary triglyceride fat, but to be absorbed less readily when eaten. It is, unfortunately, this very attribute which causes undesirable and potentially embarrassing side effects, including the frank anal discharge of the materials.

In a greater departure from conventional glyceride ester chemistry, Canadian Pat. No. 1,106,681 to Trost discloses glycerol dialkyl ether compounds which are said to have functional properties similar to those of conventional fats, but which are not absorbed in the digestive tract to any significant degree. Also, Ward, Gros and Feuge have reported in New Fat Products: Glyceride Esters of Adipic Acid JAOCS, Vol. 36, page 667 (1959) that highly viscous oils formed by reacting two glycerol molecules with a dibasic acid, such as fumaric, succinic and adipic acids, and then reacting one of the hydroxyl groups of each glycerol moiety with a fatty acid, are useful in the food industry, primarily as lubricants and coatings.

In U.S. Pat. No. 4,508,746, Hamm discloses a low-calorie substitute for at least a portion of the edible oil component in oil-based food compositions which low-calorie substitute is comprised in substantial proportion of at least one low-calorie oil component selected from the group consisting of thermally stable polycarboxylic acids having 2 to 4 carboxylic acid groups esterified with saturated or unsaturated alcohols having straight or branched carbon chains of from 8 to 30 carbon atoms. See also Hamm, D. J.; "Preparation and Evaluation of Trialkoxytricarballylate, Trialkoxycitrate, Trialkoxyglycerylether, Jojoba Oil, and Sucrose Polyester as Low Calories Replacements of Edible Fats and Oils"; J. of Food Science, Volume 49 (1984), pages 419–426.

In another attempt at simulating the natural properties of fat, Fulcher discloses certain diesters in U.S. Pat. No. 4,582,927. These compounds have at least two carboxylate groups joined to a common carbon atom, with each of the carboxylate groups containing the residue of a 12 to 18 carbon alkyl, alkenyl or dienyl alcohol.

One of the main problems in attempting to formulate fat-like compounds that have decreased absorbability and thus low caloric properties is to maintain the desirable and conventional physical properties of edible fat. Thus, to be a practical low calorie fat, a compound must mimic conventional triglyceride fat by affording the same utility in various fat-containing food compositions such as shortening, margarine, cake mixes, and the like, and be useful in frying or baking. Unfortunately, none of the prior attempts has been successful to the degree that commercial products employing them have either been approved for safety or achieved general public acceptance in their featured role.

Among the problems with non-absorbable fat-like materials is the possibility that they will leach fat-soluble vitamins and minerals from the body and that they function, when used in larger amounts, as a purgative. Many attempts have been made to solve these and related problems; however, a better solution would employ chemistry more compatible with the human digestive process, while providing a significant decrease in caloric density vis-a-vis glyceride fats.

SUMMARY OF THE INVENTION

The present invention provides a new class of fat mimetic compounds, new food compositions which contain them, and the process of employing these compounds in food compositions. The new fat mimetic materials are esters of two or more fatty alcohols and at least one fatty acid with hydroxycarboxylic acids.

The fat mimetic compounds have both carboxylate and carboxy groups extending from a backbone, are referred to herein as carboxy/carboxylate esters, and can be defined by the following formula:

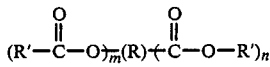

wherein

R is an organic radical;

R' is an aliphatic, ester or ether group having from 1 to 30 carbon atoms, the various R' groups being the same or different; and m and n are integers of at least 1, and the sum of m and n is at least 3.

The R group of the above formula is analogous to the glycerol residue which forms the backbone of natural fats. The total of m and n, i.e., the total number of carboxy and carboxylate groups appended to the backbone R, their placement on the backbone, the backbone structure, and the selection of various R' groups, will be determined by the properties, both biological and physical, of the desired compound.

The organic radical suitable as the backbone R group in the above formula will be of composition, configuration and size effective, with the pendant R' carboxy and carboxylate groups, to provide a compound having a perceptible fat-like character. The R group will be selected from substituted and unsubstituted aliphatic and carbocylic groups. There is no known limitation on the size of the R group or the ability to successfully substitute any of the carbons or hydrogens with sulfur, nitrogen or oxygen; however, the R group will typically contain 20 or fewer carbon atoms.

While there is no known upper limit to the values of m and n, as a practical matter of synthesis, the total will not usually exceed 25 and more typically by less than 12. The choice of the ratio of m to n, as with the selection of suitable R and R' groups and the positioning of the R' groups on the R group backbone, will affect the biological as well as the physical properties of the compounds. Where, by virtur of any of these factors, more of the pendant groups are metabolized, the caloric value of the fat mimetic compound will increase. The most preferred compounds will contribute at least one third, typically from one half to ninety percent, less calories than conventional glyceride fats. One range of ratios of m to n may be from 1:10 to 3:1, more narrowly from 1:8 to 1:1.

The R' groups are analogous to the aliphatic moieties of fatty acid residues of natural fat, and can be selected from among any of the aliphatic groups, ester groups or ether groups effective to form fat mimetic materials. Representative aliphatic groups are residues of fatty acids or fatty alcohols. Ether groups will typically be of the —R''—O—R''' structure wherein R'' and R''' are aliphatic groups. Ester groups will typically be of the

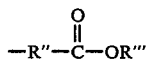

structure, with R'' and R''' as above.

The compounds are employed in any edible material or any food preparation process where a fat or oil (i.e., triglyceride fat) is normally employed, in total or partial replacement.

By judicious selection of the structural type, molecular size and the number of hydrocarbyl residues, it is possible to achieve a target reduction in calories while preferably achieving the maximum advantage from the combination of the properties of these mimetics.

DETAILED DESCRIPTION

The following description relates to a new class of fat mimetic compounds and their incorporation into any food composition or use in conjunction with any edible material. The term "edible material" is broad and includes anything edible, whether or not intended for nutrition, e.g., it can be an additive such as an antioxidant for fats or oils, an antispatter agent, an emulsifier, or other minor functional ingredient. Thus, chewing gum, flavored coatings, oils and fats intended only for frying, and the like are included. In these, all or a portion of the usual fat is replaced by a compound of the invention.

Representative of edible materials which can contain the fat mimetic compounds of the invention in full or partial replacement of natural fat are: frozen deserts, e.g., sherbet, ice cream, ices, or milk shakes; puddings and pie fillings; margarine substitutes or blends; flavored bread or biscuit spreads; mayonnaise; salad dressing, both emulsified and non-emulsified; filled dairy products such as filled cream or filled milk; dairy or non-dairy cheese spreads; coffee lighteners, liquid and dried; flavored dips; frying fats and oils; reformed and comminuted meats; meat substitutes or extenders; whipped toppings; compound coatings; frostings and fillings; cocoa butter replacements or blends; candy, especially fatty candies such as containing peanut butter or chocolate; chewing gum; bakery products, e.g., cakes, breads, rolls, pastries, cookies, biscuits, savory crackers; mixes or ingredient premixes for any of these; as well as flavor, nutrient, drug or functional additive delivery systems.

The carboxy/carboxylate esters can be employed in margarine substitutes which can be both soft or hard. In the marketplace, margarines are generally sold as one of two principal types, namely, print, hard or stick margarine and soft or tub margarine. All of these products contain liquid and hard stock components. It is an advantage of the present invention that, by eliminating some or all of the hard stock of conventional margarines, higher ratios of polyunsaturated to saturated fatty acids and lesser amounts of trans isomers can be achieved in high quality margarine products.

The fat mimetic compounds of the invention will be referred to as "carboxy/carboxylate esters". The carboxy/carboxylate esters of the present invention have not only the carboxy ester groups of conventional fats, but also have carboxylate ester groups as can be seen from the following formula:

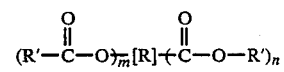

wherein

R is an organic radical;

R' is an aliphatic, ester or ether group having from 1 to 30 carbon atoms, the various R' groups being the same or different; and m and n are integers of at least 1, and the sum of m and n is at least 3.

The R group of the above formula is analogous to the glycerol residue which forms the backbone of natural fats. The organic radical suitable as the backbone R group in the above formula will be of composition, configuration and size effective, with the pendant R' carboxy and carboxylate groups, to provide a compound having a perceptible fat-like character. The R group will be selected from substituted and unsubstituted aliphatic and carbocylic groups, typically containing 20 carbon atoms or less. There is no known limitation on the size of the R group or the ability to successfully substitute any of the carbons or hydrogens with sulfur, nitrogen or oxygen. In fact derivatives sugar molecules such as sucrose, fructose, glucose, maltose, and the like, which contain oxygen within ring structures will function as backbone materials, it being, of course, necessary to append carboxyl groups for reaction with fatty acids, or otherwise form the carboxylate groups shown in the above formula.

The total of m and n, i.e., the total number of carboxy and carboxylate groups appended to the backbone R, their placement on the backbone, the backbone structure, and the selection of various R' groups, will be determined by the properties, both biological and physical, of the desired compound.

While there is no known upper limit to the values of m and n, as a practical matter of synthesis, the total will not usually exceed 25, and more typically be less than 12. The choice of the ratio of m to n, as with the selection of suitable R and R' groups and the positioning of the R' groups on the R group backbone, will affect the biological as well as the physical properties of the compounds. Where, by virtue of any of these factors, more of the pendant groups are metabolized, the caloric value of the fat mimetic compound will increase. The most preferred compounds will contribute at least one third, typically from one half to ninety percent, less calories than conventional glyceride fats. One range of ratios of m to n may be from 1:10 to 3:1, more narrowly from 1:8 to 1:1.

The R' groups are analogous to fatty acid residues of natural fat in that they are attached to a backbone for the molecule. The aliphatic groups are selected from among any of the aliphatic groups, ester groups or ether groups effective to form fat mimetic materials. Representative aliphatic groups are residues of fatty acids or fatty alcohols, for example of the structures appearing in natural fats. The present invention can, however, employ acid and alcohol residues not appearing in natural fats. The aliphatic groups can be straight or branched, saturated or unsaturated. In addition, mixtures of fatty acids derived by the hydrolysis of natural fats can also be employed. Ether groups will typically be of the —R''—O—R''' structure wherein R'' and R''' are aliphatic groups, typically from 1 to 15, more narrowly 2 to 10, carbons. Ester groups will typically be of the

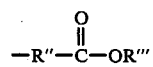

structure, with R'' and R''' as above.

The "backbone" of the carboxy/carboxylate esters of the present invention serves as a point of attachment for pendant ester residues. The pendant ester residues themselves are comprised of either carboxy or carboxylate functionalities, the carboxy functionalities being analogous to those ester residues found in natural triglycerides (having ester oxygen covalently bonded to the backbone) while the carboxylate functionalities have a configuration which is exactly reversed (having carboxylate carbon covalently bonded to the backbone).

The simultaneous presence of both carboxy and carboxylate functionalities as pendant residues on a definable carbon backbone offers a clear distinction over prior art structures which have been disclosed as potential low calorie oil and fat replacements. The present novel structures containing both carboxy and carboxylate functionalities offer several distinct advantages over many of the prior art materials which have been claimed as fat and oil analogs.

In the preferred compounds, the pendant carboxy and carboxylate residues attached to a carbon backbone offer differential reactivity with respect to cleavage by digestive enzymes. This results not only in the controlled and limited availability of effective caloric value, but also the selective conversion of the fat mimetic to a product or intermediate with a less oil-like nature. The more readily digestible carboxylic acid residue (i.e., the carboxy function) can be a highly desirable essential acid or a nutritionally advantageous carboxylic acid such as: oleic, linoleic, linolenic, eicosapentaenoic acids, as well as low molecular weight carboxylic acids (e.g., acetic, propionic, butyric acids) which would limit caloric delivery and provide additional ability to control functionality. The product of such a controlled digestive process may be said to have decreased hydrophobicity, and correspondingly increased hydrophilicity, relative to its fat mimetic precursor. Such a product of a process of controlled digestion would tend to have not only decreased oilyness, but also increased ability to function as an emulsifier. Such a controlled digestion product will be less prone to exist in the GI tract as a persistent oil compared with substances taught in the prior art. Ideally, the enhanced emulsifying capacity of the enzymatic cleavage product derived from compositions of the invention would actually be an aid to digestion, substantially overcoming a major problem which has heretofor limited the widespread use and development of highly desirable low calorie synthetic fats and oils in foods and food preparation.

During the synthetic process which leads to these new compositions, carboxylic acid and aliphatic alcohol moieties may be introduced sequentially to afford an array of structures with well defined functional and isomeric characteristics. This logical molecular assembly process also allows for the use of natural or synthetic blends of such carboxylic acids and aliphatic alcohols, as well as carboxylic acids and aliphatic alcohols which contain substantial levels of chain branching.

Another advantage offered within the scope of the present invention is to enable the construction of novel molecules and fat mimetics whose molecular weights, and melting ranges, and viscosity properties may be engineered at the molecular level so as to fall within the same desirable ranges found for natural fats and oils, so as to closely emulate the properties and the functionality of natural fats and oils used in food products.

Where the backbone R is linear, the following formula represents one group of carboxy/carboxylate esters:

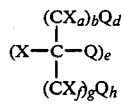

where:
C = a carbon atom;
X = H, OH, substituted or unsubstituted or lower aliphatic (e.g., $C_1$–$C_4$), the various X groups being the same or different;
Q =

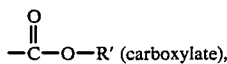

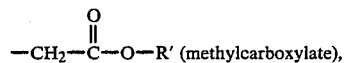

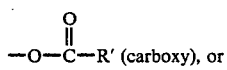

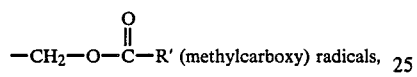

subject to the proviso that each molecule contain at least one carboxy or methylcarboxy and at least one carboxylate or methyl carboxylate radical; containing, for example, no more than 30 carbons, e.g.

the various R' groups being the same or different;
T = H or a substituted or unsubstituted aliphatic, e.g., no greater than 22 carbons, containing 0 to 5 unsaturated linkages (e.g., C=C double bonds, C≡C triple bonds) per T residue;
Z = H, OH, or an alcohol, glycol ester, e.g.,

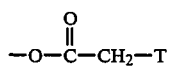

ether, or the like, residue,
and where:
a = 0 to 3, preferably 0 to 2;
b = 0 to 4, preferably 0 to 1;
d = 1 or 2;
e = 0 to 5, preferably 1 to 2;
f = 0 to 3, preferably 0 to 2;
g = 0 to 4, preferably 0 to 1;
h = 1 or 2.

Preferably, from 2 to 5 Q radicals comprise alkyl, alkenyl, alkyldienyl, alkyltrienyl, or alkynyl radicals having at least 5 carbons.

Typically, fatty alcohols having saturated or unsaturated aliphatic groups with at least 5 carbons will be employed. Preferred fatty alcohols are oleyl, linoleyl, linolenyl, stearyl, palmityl, myristyl, lauryl, capryl, eicosapentaenyl, and the like. The preferred fatty acids are of similar chain lengths and configurations. Preferred linear backbone compounds will be based on methane, ethane, propane, butane, and pentane carboxylic acids having at least two carboxylic acid groups and at least one hydroxyl group. The number of carboxylic acid groups will desireably not exceed the number of carbons in the backbone by more than 1, and the number of hydroxyl groups will desirably not be greater than the number of carboxylic acid groups. In some cases it is preferred that the ratio of hydroxyl groups to carboxylic acid groups be less than 1:2.

The particular types of fatty acids and alcohols can be selected to achieve the desired texture (both solid and liquid) and melt characteristics in the compound. Blends of carboxy/carboxylate esters with each other and/or with natural fats and oils and/or other fat mimetic materials such as sucrose polyesters can be selected for a desired melt profile and mouthfeel. This is especially desirable in the case of margarine substitutes, as will be described in greater detail below.

Among the carboxy/carboxylate esters preferred for many applications are those with melting points below about 98° F. because these materials melt completely in the mouth providing the organoleptic sensation of natural fats and oils. For some products, relatively sharp melting points, say in the range of from about 90° to 98° F., are desired because they provide a cooling sensation and a meltdown equivalent to high quality, solid natural fats.

The following is a list of representative, but non-limiting, examples of carboxy/carboxylate esters:

Didecyl Stearoyloxy-Methanedicarboxylate  (1)

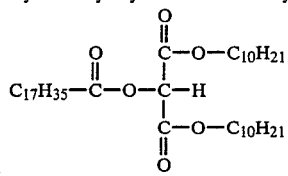

Didecyl 2-Stearoyloxy-1,1-Ethanedicarboxylate  (2)

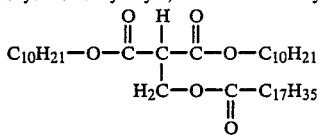

1-Decyl-2-Stearyl 1-Octanoyloxyethanedicarboxylate  (3)

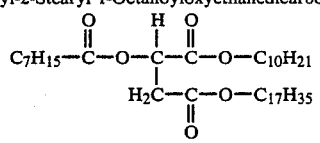

1-Stearyl-2,2-Didodecyl 1-Hexanoyloxyethanetricarboxylate  (4)

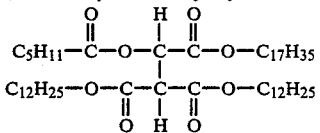

Dioleyl 2-Myristoyloxy-1,3-Propandicarboxylate  (5)

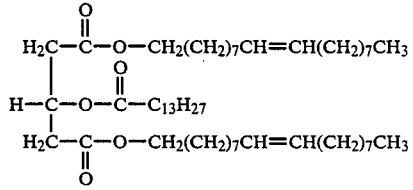

Dioleyl 3-Heptadecanoyloxy-1,2-Propandicarboxylate  (6)

-continued

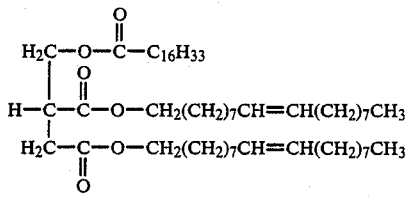

Dipalmityl 4-Oleoyloxy-1,3-Butanedicarboxylate (7)

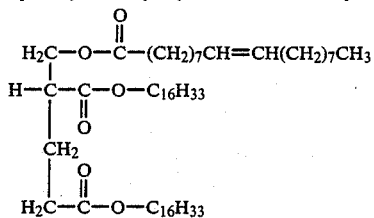

Dimyristyl 2-Palmitoyloxy-1,4-Butanedicarboxylate (8)

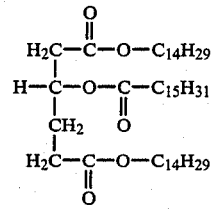

1-Dodecyl-2-stearyl 4-Myristoyloxy-1,2-Butanedicarboxylate (9)

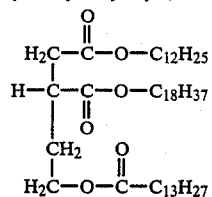

Trioleyl 4,5-Distearoyloxy-1,2,3-Pentanetricarboxylate (10)

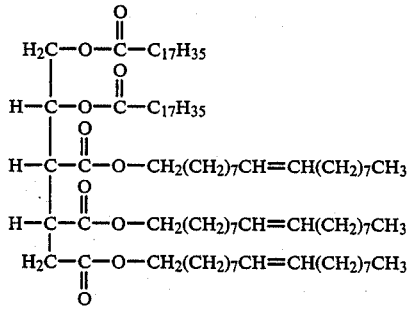

Tristearyl 5-Octanoyloxy-4-methyl-4-Hydroxy-1,2,3-Pentanetricarboxylate (11)

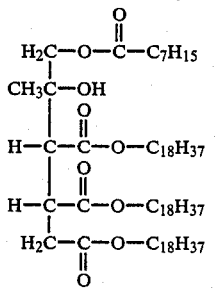

Tetrastearyl β-Oleoyloxy-1,2,4,5-Pentanetetracarboxylate (12)

-continued

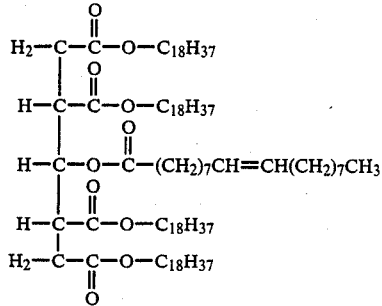

Tetraoleyl 5-Octanoyloxy-1,2,3,4-Pentanetetracarboxylate (13)

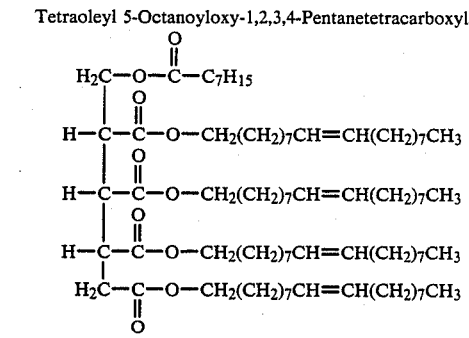

Tetrastearyl 2-Oleoyloxy-1,3,4,5-Pentanetetracarboxylate (14)

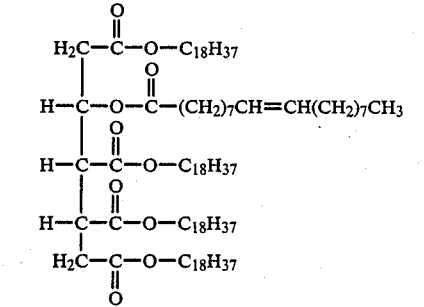

Dioleyl 2,4-di(Methylpalmitoyloxy)-3-(2,2-Dimethyl-propanoyloxy)-1,5-Dimyristoyloxypentane-2,4-Dicarboxylate (15)

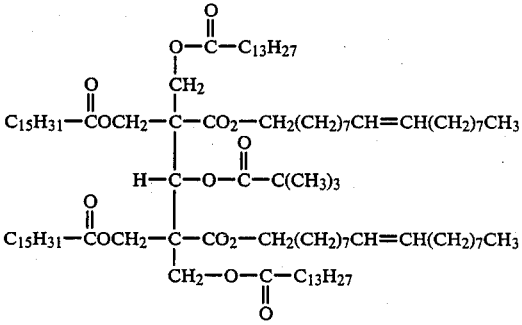

Didecyl 2-(2,2-Dimethylpropanoloxy)-1,3-Propanedicarboxylate (16)

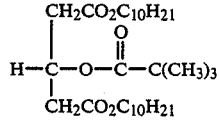

The carboxy/carboxylate esters which are most preferred as food additives are those which, upon the action of digestive enzymes in the body, yield residues which include fatty acids which may be normally metabolized and a further carboxylate residue which has a hydrophile/lipophile balance (HLB) effective to moderate the oily characteristic of the residue, and thereby moderate GI tract insult. These carboxylate residues are in themselves novel compounds.

The following examples are presented to further illustrate and explain the present invention and should not be taken as limiting in any regard. Unless otherwise indicated, all parts and percentages are by weight.

EXAMPLE 1

This example shows the preparation, from intermediates to final molecular composition, of a fat mimetic material of the invention.

Didecyl 1,3-acetonedicarboxylate. Trichloroacetic acid (0.82 g, 0.005 mole), decyl alcohol (33.56 g, 0.212 mole, about 5 mole % excess), and dimethyl 1,3-acetone dicarboxylate (17.42 g, 0.100 mole) are combined in a 250-mL single neck flask containing a magnetic stir bar and sealed with a vacuum stopcock. The two phase mixture of liquids is stirred vigorously under vacuum (about 150 mm Hg) while being heated for three hours to 130 to 140 degrees C. by means of an oil bath. At the end of this period, a weight loss of 6.37 g (theory 6.41 g) is noted. The yield (about 44.6 g) of homogeneous, colorless liquid is essentially quantitative. This product is characterized by proton nmr spectroscopy in chloroform-d: (chemical shift, intensity, multiplicity, assignment): (4.31 ppm, 4H, triplet, —OCH$_2$); (3.61 ppm, 4H, singlet, O=C—CH$_2$—CO$_2$); (1.64 ppm, 4H, multiplet, alcohol —CH$_2$—); (1.27 ppm, 28H, multiplet, alcohol —CH$_2$—); (0.88 ppm, 6H, triplet, —CH$_3$).

Didecyl propane-2-ol-1,3-dicarboxylate. Sodium borohydride (4.36 g, about 115 mmole), 100 mL ice-water (about 5 degrees C.), didecyl 1,3-acetone dicarboxylate (17.18 g, 40.3 mmole), and 50 mL pentane are combined in a 500-mL flask containing a magnetic stir bar, thermometer, and gas exit connection. The two phase mixture was stirred vigorously at ambient temperature for 3 hours. The upper phase is then separated, washed with 100 mL of distilled water, and dried over anhydrous MgSO$_4$. After vacuum filtration, the pentane solution is concentrated on a vacuum rotary evaporator to give 15.2 g. of straw colored oil (about 88% yield, mole basis). Proton nmr (in chloroform-d) is consistent with the title compound: (ppm, intensity, multiplicity, assignment); (4.44 ppm, 1H, quintet of doublets, methine H); (4.09 ppm, 4H, triplet, O—CH$_2$); (3.49 ppm, doublet, J=4.3 Hz, 1H, —OH); (2.54 ppm, 4H, doublet, J=6.3 Hz, O=C—CH$_2$—CO$_2$); (1.62 ppm, 4H, multiplet, alcohol —CH$_2$—); (1.25 ppm, 28H, multiplet, alcohol —CH$_2$—); and (0.87 ppm, 6H, triplet, —CH$_3$). A homonuclear COSY experiment confirms the A$_2$MX spin system associated with the —OH site; the product contained a residual amount of unreacted decyl alcohol.

Didecyl 2-(2,2-dimethylpropanoyloxy)-1,3-Propanedicarboxylate. The above product (4.28 g, 0.01 mole) and trimethylacetyl chloride (0.012 mole) are combined in 25 mL tetrahydrofuran and over 5 minutes a solution of triethylamine (1.09 g, 0.011 mole) in 20 mL tetrahydrofuran is added dropwise with stirring. After stirring overnight, 1.0 g of white solid is recovered by filtration (theory for triethylammonium chloride is 1.38 g). The filtrate is evaporated and the residue dissolved in 50 mL pentane. This solution is washed with 100 mL aqueous sodium carbonate and then dried over anhydrous magnesium sulfate. Filtration and evaporation of the pentane affords 4.18 g of pale yellow oil (theory is 5.1 g). The nmr spectrum of the product in chloroform-d shows the disappearance of the —OH proton and a new methine proton quintet at 4.52 ppm, consistent with the introduction of the carboxy function noted in the title structure.

This product exhibits the oily feel of vegetable oil.

EXAMPLE 2

Another fat mimetic (dioley 2-myristoyloxypropane-1,3-dicarboxylate) is prepared by first preparing dioleyl 1,3-acetonedicarboxylate.

Trichloroacetic acid (9.8 g, 0.06 mole), dimethyl 1,3-acetonedicarboxylate (139.3 g, 0.80 mole), and oleyl alcohol (451.1 g, 1.68 mole) are combined in a 2000 mL flask fitted with a distillation head, thermometer, and Teflon coated stirrer bar. The system is evacuated to about 150 mm Hg and was heated at 130–40 degrees C. for 17 hours. A quantitative yield of clear orange oil was obtained. A proton NMR spectrum in chloroform-d is consistent with the proposed structure: (chemical shift, intensity, assignment): (5.35 ppm, 4H, =C—H); (4.13 ppm, 4H, O—CH$_2$—); (3.61 ppm, 4H, O=C—CH$_2$—CO$_2$); (2.01, 1.62 and 1.27 ppm, 56H, C—CH$_2$—C); and (0.88 ppm, 6H, —CH$_3$).

This product is then reacted to form dioleyl propane-2ol-1,3-dicarboxylate. Sodium borohydride (11.23 g, 0.3 mole), 400 mL ice water, dioleyl 1,3-acetonedicarboxylate (97.06 g, about 0.15 mole), and 200 mL pentane are combined in a 1000 mL flask fitted with a magnetic stirrer bar and a thermometer. The mixture is stirred vigorously for about 7 hours whereupon saturated NaCl solution and additional pentane are added, and the isolated organic layer is washed successively with 5% HCl and distilled water. The pentane solution is dried over anhydrous MgSO$_4$, filtered and evaporated to give 83.9 g (86 mole % yield) of clear straw colored oil whose proton NMR spectrum in chloroform-d supports the proposed structure: (chemical shift, intensity, assignment); (5.35 ppm, 4H, =C—H); (4.46 ppm, 1H, methine proton); (4.10 ppm, 4H, O—CH$_2$—); (3.45 ppm, 1H, —OH); (2.55 ppm, 4H, O=C—CH$_2$—CO$_2$); (2.00, 1.63 and 1.26 ppm, 56H, C—CH$_2$—C); and (0.88 ppm, 6H, —CH$_3$); the product contained about 8% unreduced dioleyl 1,3-acetone-dicarboxylate.

This intermediate product is then reacted to form dioleyl 2-myristoyloxypropane-1,3-dicarboxylate. Dioleyl propane-2-ol-1,3-dicarboxylate (6.49 g, about 0.01 mole) and myristoyl chloride (2.92 g, about 0.012 mole) are heated at 110 degrees C. for 22 hours under about 200 mm Hg vacuum. Proton NMR analysis of the clear orange oily product (8.81 g) is consistent with greater than 95%, molar basis, conversion to the title structure: (chemical shift, intensity, assignment): (5.51 ppm, 1H, methine proton); (5.35 ppm, 4H, =C—H); (4.07 ppm, 4H, O—CH$_2$—); (2.70 ppm, 4H, O=C—CH$_2$—CO$_2$); (2.27, 2.01, 1.61 and 1.27 ppm, 80H, C—CH$_2$—C); and (0.88 ppm, 9H, —CH$_3$).

This material is an oily liquid similar to vegetable oil.

EXAMPLE 3

By essentially the same procedure as detailed in Examples 1 and 2, dimethyl 1,3-acetonedicarboxylate is allowed to react with two molar equivalents of equal amounts of oleyl alcohol and palmityl alcohol. The product is subsequently reduced with sodium borohydride in an ether-water emulsion and the product from this process is isolated and permitted to react with one molar equivalent of a 2:1:1 (mole ratio) mixture of myristoyl, stearoyl, and butyryl chlorides to afford a fat mimetic composition whose properties emulate those of natural butterfat.

EXAMPLE 4

Filled Cream. About 18 Kg of a fat mimetic (mp 32 to 35 degrees C.) of Example 3 is homogenized with 82 Kg of skim milk in a conventional dairy homogenizer to afford a "filled cream" composition.

EXAMPLE 5

Ice Cream. The "filled cream" composition of Example 4 (68 parts) is combined with 15 parts condensed skim milk, 15 parts sugar, 0.5 parts gelatin, 1.0 part flavor, and 0.25 parts color to produce an ice cream mix which is processed in the normal manner to yield a modified ice cream product.

EXAMPLE 6

Filled Milk. About 100 parts of the filled cream composition prepared in Example 4 is combined with about 620 parts of skim milk to prepare a "filled milk" composition.

EXAMPLE 7

Cheese Products. The filled milk product obtained in Example 6 is treated like natural milk in the normal cheese making process (as is practiced, for example in the production of cheddar or swiss cheese). Preferably 10% butter oil is added to the fat mimetic portion of the filled milk product before it is employed in this process to enhance the proper flavor development of the cheese products.

EXAMPLE 8

Butter cream icing is prepared by blending:

| Ingredient | g. |
|---|---|
| Sugar | 227.0 |
| Fat mimetic of Example 2 | 70.8 |
| Water | 28.4 |
| Non-Fat Dry Milk | 14.0 |
| Emulsifier (used with di-alkyl glycerol ether blend only) | 1.4 |
| Salt | 1.0 |
| Vanilla | 1.0 |

All of the ingredients are creamed in a mixer at medium speed.

EXAMPLE 9

Vanilla Wafers. Twenty-five parts of a (plastic) fat mimetic are blended with 100 parts flour, 72 parts granulated sugar, 5 parts high fructose corn syrup, 1 part non-fat dry milk, 1 part salt, 1/10 part ammonium bicarbonate, 1 part dried egg yolk, 1/10 part sodium bicarbonate, and 55 parts water. The dough so formed is rolled, wire cut to ¼ inch thickness, and baked by the usual process to give a vanilla wafer cookie.

EXAMPLE 10

Coconut Oil Mimetic. Didodecyl propane-2-ol-1,3-dicarboxylate (10 parts) prepared in accordance with the procedure outlined in Example 1 is allowed to react with a mixture of 1.4 parts palmitoyl chloride, 1.4 parts oleoyl chloride, 1 part capryloyl chloride, and 1 part decanoyl chloride at reduced pressure and 115 degrees C. for 22 hours to give a fat mimetic whose properties emulate natural coconut oil.

EXAMPLE 11

Sprayed Crackers. A dough prepared from 100 parts flour, 5 parts sugar, 1.5 parts malt, 7.5 parts of the fat mimetic prepared in Example 10, 1 part salt, 0.9 parts sodium bicarbonate, 2.5 parts non-fat dry milk, 2.5 parts high fructose corn syrup, 0.75 parts mono calcium phosphate, and 28 parts water is sheeted, stamped, and baked to produce a cracker product.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention which is defined by the following claims.

We claim:

1. A fat mimetic compound of the following formula, useful as a fat replacement in edible materials:

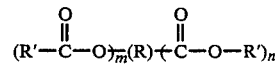

wherein
R is a linear chain having 2–5 carbon atoms;
R' is a linear aliphatic group having from 4 to 30 carbon atoms, the various R' groups being the same or different, adapted to provide perceptible fat-like character; and
m and n are integers of at least 1, and the sum of m and n is at least 3.

2. A compound according to claim 1 wherein R' is an aliphatic group which is a residue from a fatty alcohol selected from the group consisting of oleyl, linoleyl, linolenyl, stearyl, palmityl, myristyl, lauryl, and capryl alcohol, or the corresponding acid residues, and mixtures thereof.

3. A compound according to claim 1 wherein the sum of m+n is 3 to 6.

4. A compound according to claim 3 wherein the sum of m+n is 3.

5. A compound according to claim 1 wherein m is at least 1; n is at least 2; and R' is an aliphatic group of a fatty acid.

6. A compound according to claim 5 wherein m is 1 and n is 2.

7. A fat mimetic compound of the following formula:

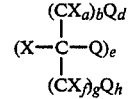

where:
C=a carbon atom;
X=H or OH;
Q=

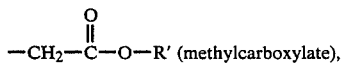

-continued

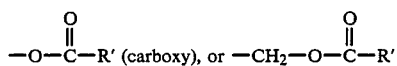

(methylcarboxy) radicals, subject to the proviso that each molecule contain at least one carboxy or methylcarboxy and at least one carboxylate or methyl carboxylate radical;

R' = An aliphatic group, containing 4 to 30 carbons, the various R' groups being the same or different, adapted to provide perceptible fat-like character;

and where:
a = 1 to 3;
b = 0 to 2;
d = 1 to 2;
e = 0 to 3;
f = 1 to 3;
g = 1 to 2;
h = 1 to 2.

8. A compound according to claim 7 wherein:
a = 1 to 2;
b = 1;
d = 1 to 2;
e = 0 to 1;
f = 1 to 2;
g = 1; and
h = 1 to 2.

9. A compound according to claim 7 wherein at least 2 to 5 O radicals comprise alkyl, alkenyl, alkyldienyl, alkyltrienyl, or alkynyl radicals having at least 5 carbons.

10. A compound according to claim 8 wherein the ratio of carboxy groups to carboxylate groups is less than 1:1.

11. The compound didecyl stearoyloxymethanedicarboxylate.

12. The compound didecyl 2-stearoyloxy-1,1-ethanedicarboxylate.

13. The compound 1-decyl-2-stearyl 1-octanoyloxyethanedicarboxylate.

14. The compound 1-stearyl-2,2-didodecyl 1-hexanoyloxyethanetricarboxylate.

15. The compound dioleyl 2-myristoyloxy-1,3-propandicarboxylate.

16. The compound dioleyl 3-heptadecanoyloxy-1,2-propandicarboxylate.

17. The compound dipalmityl 4-oleoyloxy-1,3-butanedicarboxylate.

18. The compound dimyristyl 2-palmitoyloxy-1,4-butanedicarboxylate.

19. The compound 1-dodecyl-2-stearyl 4-myristoyloxy-1,2-butanedicarboxylate.

20. The compound trioleyl 4,5-distearoyloxy-1,2,3-pentanetricarboxylate.

21. The compound tristearyl 5-octanoyloxy-4-methyl-4-hydroxy-1,2,3-pentanetricarboxylate.

22. The compound tetrastearyl 3-oleoyloxy-1,2,4,5-pentanetetracarboxylate.

23. The compound tetraoleyl 5-octanoyloxy-1,2,3,4-pentanetetracarboxylate.

24. The compound tetrastearyl 2-oleoyloxy-1,3,4,5-pentanetetracarboxylate.

25. The compound didecyl 2-(2,2-dimethylpropanoyloxy)-1,3-propanedicarboxylate.

26. The compound dioleyl 2,4-di(methylpalmitoyloxy)-3-(2,2-dimethylpropanoyloxy)-1,5-dimyrestoyloxypentane-2,4-dicarboxylate.

27. A fat mimetic compound of the following formula:

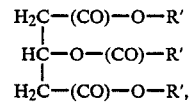

where R' is an aliphatic group containing 4 to 30 carbons, the various R' groups being the same or different, adapted to provide perceptible fat-like character.

28. A compound according to claim 27 wherein at least one R' contains 10 to 23 carbons.

29. A fat mimetic compound of the following formula:

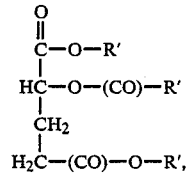

where R' is an aliphatic group containing 4 to 30 carbons, the various R' groups being the same or different, adapted to provide perceptible fat-like character.

30. A compound according to claim 29 wherein at least one R' contains 10 to 23 carbons.

31. A fat mimetic compound of the following formula:

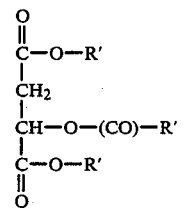

where R' is an aliphatic group containing 4 to 30 carbons, the various R' groups being the same or different, adapted to provide perceptible fat-like character.

32. A compound according to claim 31 wherein at least one R' contains 10 to 23 carbons.

* * * * *

UNITED STATES PATENT AND TRADEMARK OFFICE
CERTIFICATE OF CORRECTION

PATENT NO. : 4,830,787
DATED : May 16, 1989
INVENTOR(S) : Lawrence P. Klemann et al.

It is certified that error appears in the above-identified patent and that said Letters Patent is hereby corrected as shown below:

"virtur", col. 3, line 40, should read --virtue--

"-R'-O-R'''", col. 3, line 54, should read -- -R''-O-R'''--

"-R'-O-R'''", col. 5, line 50, should read -- -R''-O-R'''--

"dioley", col. 12, line 8, should read --dioleyl--

Signed and Sealed this

Seventeenth Day of April, 1990

Attest:

HARRY F. MANBECK, JR.

Attesting Officer        Commissioner of Patents and Trademarks